United States Patent [19]

Hokkanen

[11] Patent Number: 5,675,628
[45] Date of Patent: Oct. 7, 1997

[54] METHOD AND APPARATUS FOR ENABLING ROAMING OF SUBSCRIBER AMONG PLURAL MOBILE RADIO SYSTEMS, USING MOBILE EQUIPMENT ACCEPTING REMOVABLE SUBSCRIBER IDENTITY MODULE

[75] Inventor: Petri Hokkanen, San Diego, Calif.

[73] Assignee: Nokia Telecommunications Oy, Espoo, Finland

[21] Appl. No.: 285,123

[22] Filed: Aug. 1, 1994

[51] Int. Cl.$^6$ .................................................. H04Q 7/20
[52] U.S. Cl. ................................... 379/58; 455/54.1
[58] Field of Search ........................ 379/58, 59, 60, 379/62, 356, 357; 455/33.1, 33.2, 33.4, 54.1, 54.2, 56.1

[56] References Cited

U.S. PATENT DOCUMENTS

| | | | |
|---|---|---|---|
| 4,864,599 | 9/1989 | Saegusa et al. | 379/62 X |
| 5,123,111 | 6/1992 | Delory et al. | 379/60 X |
| 5,329,573 | 7/1994 | Chang et al. | 379/58 |
| 5,375,251 | 12/1994 | Pfundstein | 455/33.4 |
| 5,404,580 | 4/1995 | Simpson et al. | 455/89 |

FOREIGN PATENT DOCUMENTS

| | | | |
|---|---|---|---|
| 0 562 890 | 9/1993 | European Pat. Off. | H04Q 7/04 |
| 0 584 725 | 3/1994 | European Pat. Off. | H04Q 7/00 |
| 9112698 | 8/1991 | WIPO. | |
| 94/30023 | 12/1994 | WIPO | H04Q 7/04 |

OTHER PUBLICATIONS

"The GSM System for Mobile Communications", Michel Mouly et al, 1992, pp. 67–70, 468–469, 489–492.

*Primary Examiner*—Dwayne Bost
*Assistant Examiner*—William G. Trost
*Attorney, Agent, or Firm*—Cushman Darby & Cushman Intellectual Property of Pillsbury Madison & Sutro LLP

[57] ABSTRACT

A subscriber identification module (SIM) for storing user-identities and other user specific information and thereby enabling access to the service of the radio system. One of the user identities is a Temporary Mobile Subscriber Identity (TMSI) used for user anonymity purposes by utilizing the TMSI as an alias for the actual user identity in order to avoid sending the actual user identity in the clear on the radio path. A part of the TMSI is a random number which cannot be used to identify the user/terminal without mapping information to the actual user identity, which is found in the telecommunications network entity that allocated the random number. SIM roaming from one radio system to another is possible by utilizing predetermined bits of TMSI to differentiate between different TMSI's of different systems by indicating in a uniform manner in all mobile radio systems the mobile radio system which has allocated the TMSI. The remaining bit locations of the TMSI provided in a mobile radio system-specific format. During an inter-system SIM roaming, the old TMSI will be copied from SIM and forwarded to a new mobile radio system. The new system will use the predetermined bits of the TMSI to identify the old system in order to request the actual user identity.

4 Claims, 5 Drawing Sheets

TMSI in GSM SIM-card is 9 bytes, 72 bits long

TMSIs for other systems can be separated by using bits 5-8 of octet 6, which in GSM TMSI are coded as '1111'

METHOD AND APPARATUS FOR ENABLING ROAMING OF SUBSCRIBER AMONG PLURAL MOBILE RADIO SYSTEMS, USING MOBILE EQUIPMENT ACCEPTING REMOVABLE SUBSCRIBER IDENTITY MODULE

FIELD OF THE INVENTION

The invention relates to a method and mobile radio system which utilizes a removable data storage module (herein designated a SIM) which contains data related to an identification and authentication of a subscriber of a mobile radio terminal.

BACKGROUND OF THE INVENTION

The specifications of GSM, the European Digital Cellular System for Land Mobile Radio Communications, defines that all the information elements needed by the radio system to identify, authenticate and locate a mobile subscriber will be contained into a dedicated module, called a SIM (Subscriber Identity Module), which is removable and allows the use of different mobile stations. The remaining part of the mobile station, called a mobile equipment (ME), is intended to contain all the mechanisms and devices which are needed to access the GSM services (for instance the radio equipment) but are not specific to a given subscriber. Further, the SIM is removable from the mobile equipment and the interface between the subscriber identity module and the mobile equipment is standardized in ETSI specification GSM 11.11. This interface is in accordance with ISO standards on IC cards (ISO 7816) The SIM may be a part of the multi-service card, of which GSM mobile telecommunication is one of the applications. This feature allows the mobile equipment to be a universal equipment operable by different mobile subscribers in turn, each using his or her own SIM. The SIM can be either a smart card which has a well-known size corresponds to that of credit cards, or it can be provided in a much smaller format, called a "plug-in SIM". The latter format is more suitable for handportable terminal equipment.

As noted above, GSM systems are using a SIM-card that stores user identities and other user specific information and thereby enables access to the service of the radio system. Only a combination of the SIM and the ME makes an operative mobile station MS for GSM system. The same SIM card may be used in any GSM mobile equipment ME. It is even possible that a mobile subscriber has only a personal subscriber identity module SIM and rents the remaining part of the mobile station, i.e., the mobile equipment ME, when needed. This transferring of the SIM instead of the entire mobile station MS and using different mobile equipment ME is sometimes called a "SIM roaming" within the GSM system.

Also, other mobile radio systems in addition to GSM may use the same kind of smart card for similar purposes, thus enabling user specific information to roam between different mobile radio systems independently of the air interface specifications. For example, in the U.S.A. the so called Personal Communications Systems (PCS) are being developed having several different air interfaces. Also, in Europe, DCS 1800, which is a mobile radio system realized according to GSM specifications, expect different radio interface (carrier frequencies of approximately 1800 MHz instead of that of approximately 900 MHz in GSM system) utilizes SIM cards. The smart card may be the only common nominator between these systems to provide "SIM roaming" between systems. It is desirable to have the same smart card in different systems, because the user does not have to change his/her user profile when the terminal and/or air interface needs to be changed.

One identity type for a mobile subscriber in a mobile radio system is a Temporary Mobile Subscriber Identity (TMSI). This mobile identity type is used for user anonymity purposes by utilizing it as an alias for the actual user identity in order to avoid sending the actual user identity in the clear on the radio path. A part of TMSI is a random number which can not be used to identify the user/terminal without mapping information to the actual user identity, which is found in the telecommunications network entity that allocated the random number.

The TMSI is also stored in the SIM-card, but in the GSM-specific way, using identities pertaining only to GSM. For user-anonymity reasons, it is desirable to also have TMSI-roaming between different systems with different kinds of air interfaces, i.e., also the TMSI allocated for the user and stored in the SIM card in an "old" mobile radio system all is transferred to a "new" mobile radio system by SIM roaming. The problem, however, is that the TMSI as specified for GSM does not have any relevance in other mobile radio systems. Further the GSM SIM card contains only a single storage location for a single TMSI.

SUMMARY OF THE INVENTION

An object of the present invention is to allow temporary mobile subscriber identity roaming between different mobile radio systems.

A further object is a method to differentiate between temporary mobile subscriber identities of different systems and to store them in a smart card in a uniform way.

One aspect of the present invention is a method and apparatus utilizing a removable subscriber identification module for a mobile radio terminal, comprising electrically alterable memory means for storing data related to an identification and authentication of a mobile subscriber, the memory means including a predetermined storage location for storing a temporary mobile subscriber identity, an identity of a mobile radio system which has allocated the temporary mobile subscriber identity being indicated in predetermined bit locations in the temporary mobile subscriber identity in a manner independent from the mobile radio system, the remaining bit locations of the temporary mobile subscriber identity being stored in a mobile radio system specific format.

Another aspect of the present invention is an inter-system roaming method, comprising steps of allocating a temporary mobile subscriber identity for a mobile subscriber in a first mobile radio system having a first radio interface, an identity of the mobile radio system being indicated in predetermined bit locations in the temporary mobile subscriber identity in a manner independent from the first mobile radio system, sending the temporary subscriber identity to a first mobile station of the mobile subscriber, the mobile station comprising a removable subscriber identification module for storing data related to an identification and authentication of a mobile subscriber, as well as a first mobile equipment capable of operating in said first mobile radio system, storing the temporary mobile subscriber identity into predetermined storage location in the removable subscriber identification module, removing the mobile subscriber identification module from the first mobile station, inserting the mobile subscriber identification module into a second mobile station comprising a second mobile subscriber equipment capable of operating in a second mobile radio system having a second radio interface, copying the temporary mobile subscriber identity from the mobile subscriber identification module, sending the temporary mobile subscriber identity to a fixed network of the second mobile radio system, analyzing the predetermined bit locations in the temporary mobile subscriber identity in order to find the identity of the first mobile radio system, requesting an actual identity of the mobile subscriber from the first mobile radio system by means of the identity of the first mobile radio system and said temporary mobile subscriber identity.

A still further aspect of the present invention is a mobile radio system, comprising a mobile exchange, mobile stations each including a removable subscriber identification module for storing data related to an identification and authentication of a mobile subscriber, as well as a first mobile equipment capable of operating in the first mobile radio system, and a visitor location register including means for allocating temporary mobile subscriber identities for mobile subscribers in the mobile radio system, an identity of the mobile radio system being indicated in predetermined bit locations in the temporary mobile subscriber identity in a manner independent from the first mobile radio system, means for analyzing the predetermined bit locations in a temporary mobile subscriber identity received from a mobile station in order to find an identity of a mobile radio system which has allocated the temporary mobile subscriber identity, means for requesting an actual identity of the mobile subscriber from a mobile radio system which has allocated the temporary mobile subscriber identity by means of the analyzed mobile radio system identity and the temporary mobile subscriber identity.

In practicing the present invention, predetermined bits of a temporary mobile subscriber identity TMSI are used to differentiate between different TMSI's of different systems by indicating in a uniform manner in all mobile radio systems the mobile radio system which has allocated the TMSI. The remaining bit locations of the TMSI may be in a mobile radio system-specific format. During SIM-roaming between two different mobile radio systems, the mobile station reads the TMSI from the subscriber identification module and makes a copy of the TMSI to an air-interface message. The TMSI is forwarded to a mobile radio system, which decodes the TMSI. The new system can use the predetermined bits of the TMSI to find out the actual structure of the TMSI and the mobile radio system that allocated the TMSI. The new system is provided with an interconnection to other networks/systems through which the new system can request the actual user identity from the old system because the old system is the only place containing mapping between the TMSI and the actual user identity.

BRIEF DESCRIPTION OF THE DRAWINGS

The preferred embodiments of the invention will be described with reference to attached drawings, wherein.

DETAILED DESCRIPTION OF THE PREFERRED EMBODIMENTS OF THE INVENTION

The present invention is applicable to all mobile radio systems utilizing subscriber identity modules SIMs or the like. The present invention is particularly advantaged when applied in the pan-European digital mobile radio system GSM or in the modification thereof, DCS1800. In the following, the preferred embodiment of the invention will be described as an application in a GSM system, to which the invention, however, is not intended to be limited.

Figure 1:
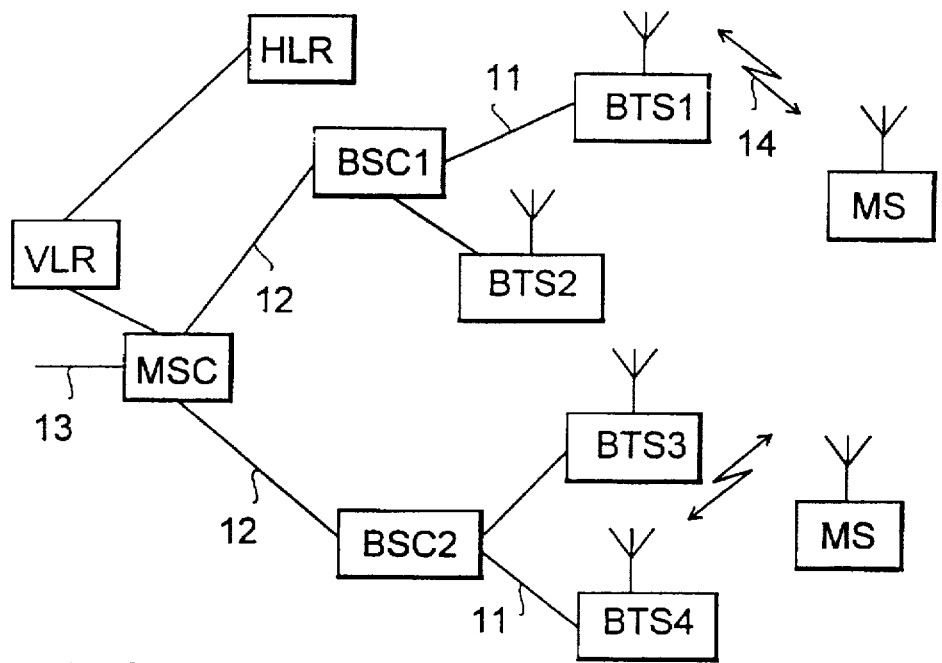
FIG. 1 is a block diagram illustrating a cellular mobile radio system.

FIG. 1 shows schematically a portion of a GSM cellular radio system. In the cellular radio system, the area covered by the system is divided into radio cells. Base station controllers BSC1 and BSC2 are connected by digital transmission links 12 to a mobile exchange MSC. Furthermore, base stations BTS1, BTS2 and BTS3, BTS4 are connected by digital transmission links 11 to the base station controllers BSC1 and BSC2, respectively. Each BSC and the base stations BTS controlled by it form a base station system BSS. The radio coverage area of a single base station BTS typically creates a single radio cell. Each base station BTS1 to BTS4 has a predetermined fixed number of physical radio channels. The configuration and properties of the GSM system are described in more detail in the GSM specifications and in the book "The GSM System for Mobile Communications, M. Mouly & M. B. Pautet, Palaiseau, France, 1992, ISBN:2-9507190-0-7, which are hereby incorporated by reference.

Subscriber data, such as location data, are stored permanently in a home location register (HLR). The HLR also contains the original user profiles. The HLR also has an associated authentication center AC (not shown), which may be integrated or separate. The authentication center contains subscriber authentication data and authentication algorithms. The system also comprises several visitor location registers (VLRs) each associated with one or more MSC area. Each VLR is a data base in which subscriber data, i.e., the copies of the original user profile, are stored while a respective mobile station MS is visiting the area of a respective MSC. The VLR also contains the temporary mobile subscriber identity associated with the user profile. The VLR further has a mapping to obtain an actual user identity on the basis of the TMSI.

According to the GSM specifications, all the information elements contained in an MS which are related to a mobile subscriber must be stored and operated within a specific module, called a subscriber identity module SIM. The remaining part of the MS, called a mobile equipment ME, contains the hardware and software specific to the radio interface. Specification GSM 2.17 specifies the operation of a SIM, and specification GSM 11.11 specifies the instruction format and encoding for use in a SIM as well as the interface between the SIM and the ME. The SIM can be a smart card, an IC card SIM, the interface of which with the outside world is provided in accordance with ISO standards on IC cards, i.e., ISO 7816 series. An IC card SIM of a standard size may be too large for handportable radios, and therefore, also a plug-in SIM which is a dedicated module fully standardized within the GSM system and intended to be semipermanently installed in the ME can be used.

In the GSM system, the identification of a mobile subscriber is based on the SIM card. The mobile subscriber is able to use different mobile equipment ME, but is all the time using the same SIM card and thereby can be reached by the same subscriber number. Without the SIM card only emergency calls can be made by the ME. When used in the ME, the SIM shall provide when it is in GSM network operation a storage of subscriber-related security information (according to recommendations GSM 02.09) e.g., temporary mobile subscriber identity TMSI and a key Ki, and an implementation of authentication and cipher key generation mechanisms according to recommendation GSM 03.20 (i.e. algorithms A3 and A8). For the user's own security, the SIM must handle a 1 digit PIN code (Personal identification number). Furthermore, the SIM storage capability may provide facilities to memorize and manage additional information elements related to the mobile subscriber in association with GSM services and MS features.

Figure 2:
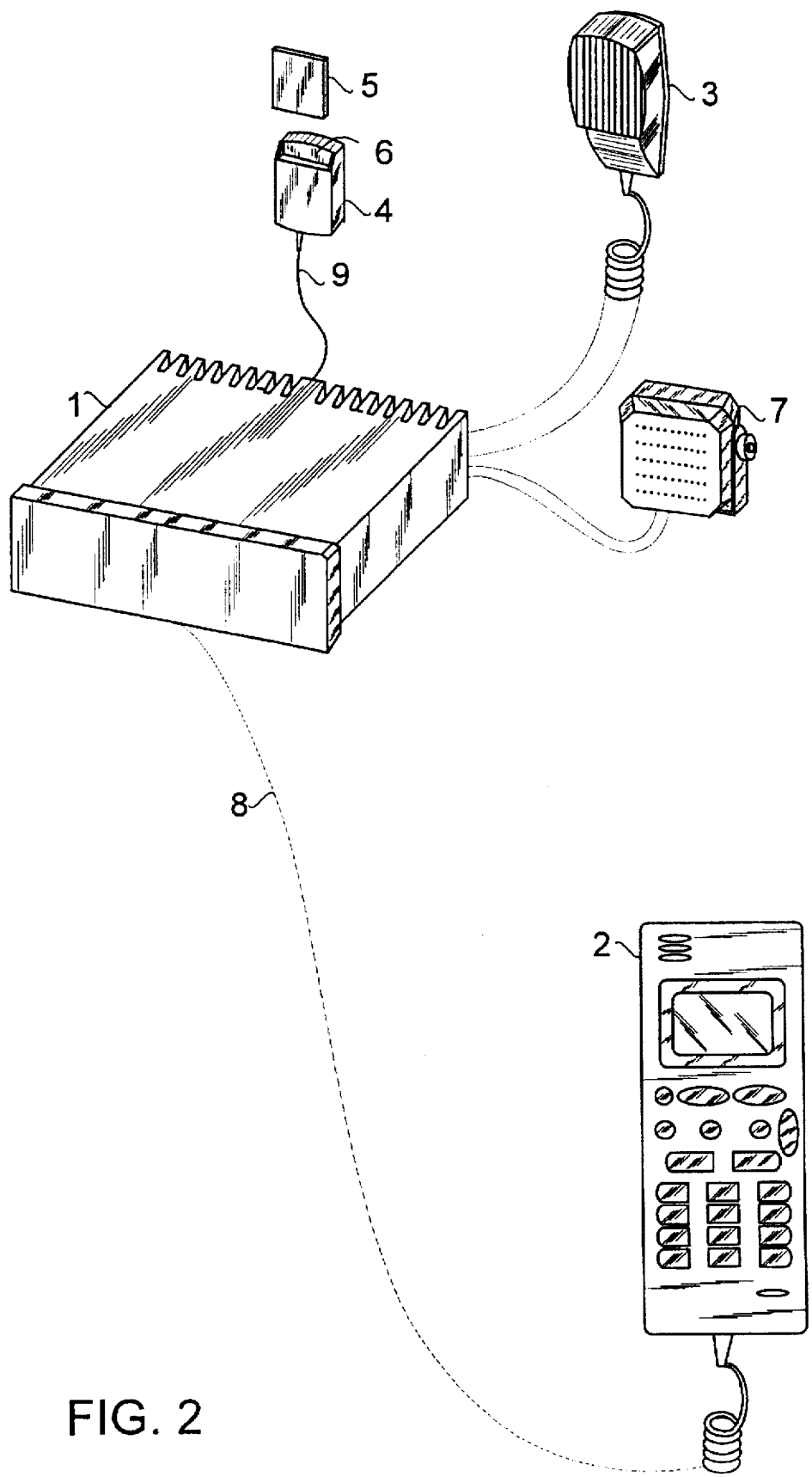
FIG. 2 shows a vehicle mounted mobile station.

The present invention may be applied in a mobile radio system to any type of mobile radio station MS, e.g., a portable mobile phone or a vehicle-mounted station with an ability of using a removable memory. FIG. 2 shows, as an example of an mobile radio station, a radio telephone unit which can be mounted in a vehicle. The mobile station MS of FIG. 2 comprises a radio unit 1, which is connected by a cable 8 to a handset 2. The handset 2 includes normal components and functions: a microphone, a loudspeaker, and a user interface formed by a display and a keypad. In order to allow a handsfree operation, the radio unit 1 may also be connected to a separate microphone 3 and a separate loudspeaker 7. Further, a separate reading device 4 for a memory card or memory module 5, referred to as a subscriber identity module SIM herein, is connected to a radio unit 1 via cable 9. A reading device 4 includes a card slot 6, in which a SIM card 5 can be inserted in a reading device in a such way that the SIM card it can later be easily removed or detached. One example of a vehicle-mounted mobile station is Nokia GSM model 6050 manufactured by Nokia Mobile Phones Inc., Finland. Any of the mobile stations may instead be a portable terminal wherein the card reading device, the radio sections and the handset are integrated into one piece. One example of such a portable mobile station is Nokia 101 GSM manufactured by Nokia Mobile Phones Inc., Finland.

Figure 3:
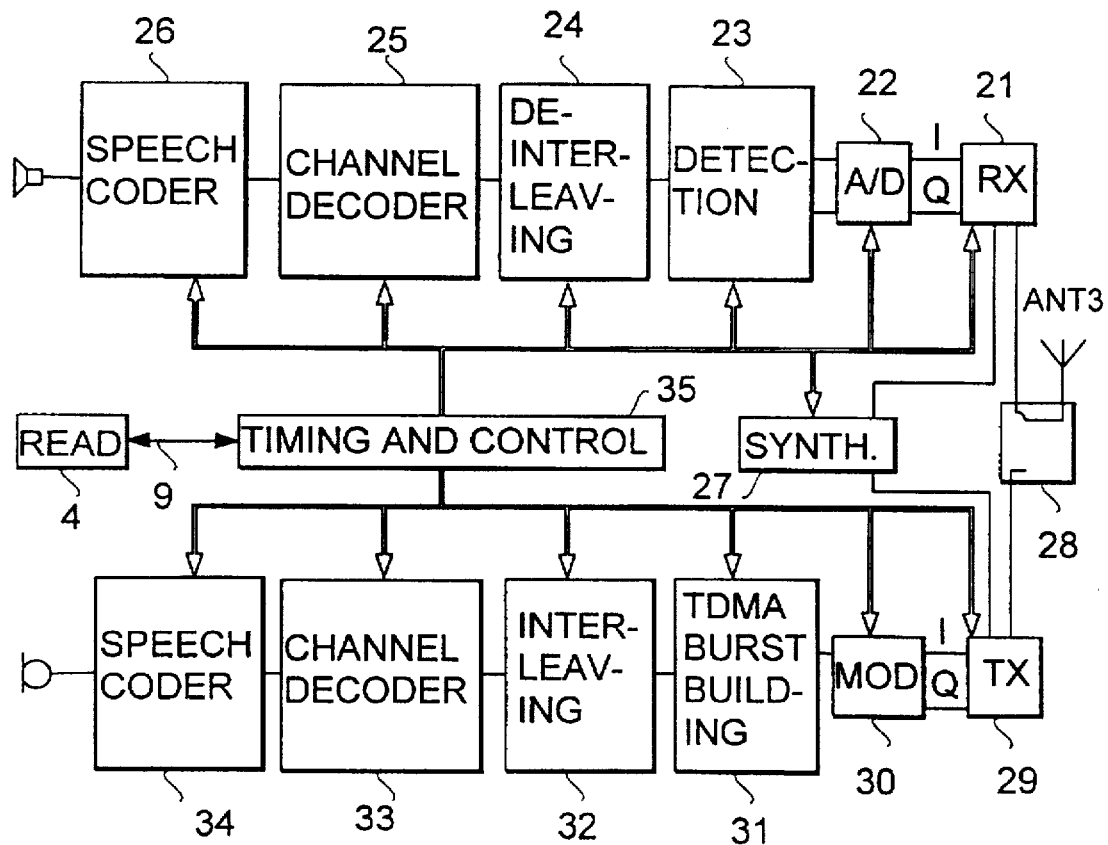
FIG. 3 is a block diagram of a mobile station consisting of a mobile equipment ME and a subscriber identity module SIM.

FIG. 3 shows a block diagram of a mobile equipment part ME of a mobile station MS. The ME comprises an antenna 3, a duplex filter 28, a receiver 21, a transmitter 29 and a synthesizer 27. In a receiving direction, a series connection of an A/D converter 22, a detector 23, a deinterleaving means 24, a channel decoder 25, speech decoder 26 and a loud speaker is provided subsequent to receiver 21. In a transmitting direction, a series connection of a microphone, a speech coder 34, a channel coder 33, an interleaving unit 32, a TDMA burst building unit 31 and a modulator 30 is provided prior to the transmitter 29. All the above-mentioned blocks are controlled by a timing and control unit 35, which processes all outbound and inbound messages. The timing and control unit 35 is further connected to a SIM card-reading device 4 via cable 9.

Figure 4:
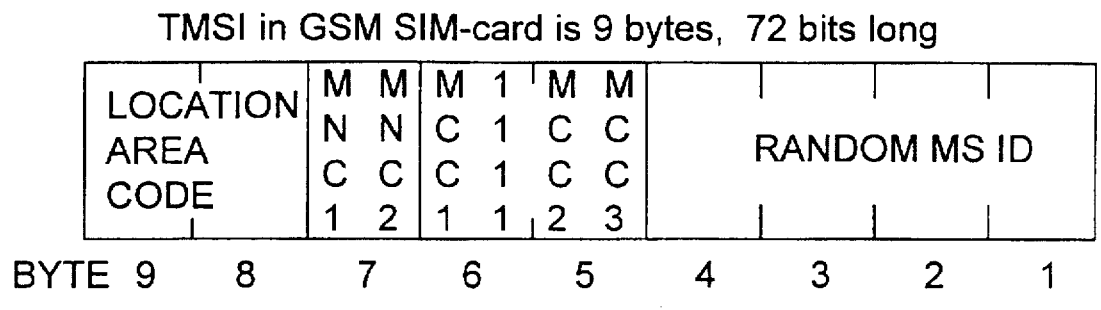
FIG. 4 illustrates the GSM TMSI format.

As mentioned above, the temporary mobile subscriber identity (TMSI) is a mobile identity type used for user anonymity purposes by utilizing it as an alias for the actual user identity in order to avoid sending the actual user identity in the clear on the radio path. A TMSI for GSM has been specified as shown in FIG. 4. A GSM TMSI is a 72 bit long digit string, in its maximum having nine octets, 1 to 9. The octets 1 to 4 contain a random MS identity, i.e., a random number which is allocated at a given moment to a certain mobile station in a current location area. The location area code LAI of the current location area is given in the octets 8 and 9 of the TMSI. The random MS ID cannot be used to identify the user/terminal without mapping information to the actual user identity, which is found in the telecommunications network entity (MSC/VLR) that allocated the random MS identity. The octets 5 and 7, as well as bits 1 to 4 in octet 6, are in other use. The remaining bits 5 to 8 in the octet 6 are not presently used for anything in GSM but they are merely filling bits for coding purposes.

In the GSM system, TMSIs are managed by the MSC/VLR. A GSM TMSI is meaningful only within one location area, being first allocated (by the respective MSC/VLR) to a MS the first time it registers in the location area, and being released when the MS leaves the location area. When the MS performs a location attempt in a new cell in a new location area, the TMSI used in the "old" location area will be sent to an MSC/VLR of the location area. If the MSC/VLR of the new location area is other than the one which allocated the "old" TMSI, the new MSC/VLR has to request the actual identity, IMSI, of the MS from the previous MSC/VLR, as indicated by the LAI part of the TMSI. As a result, the actual identity of the MS will not be sent on the radio path.

The TMSI is stored in the SIM-card TMSI in the same way as it is sent on the air interface, i.e., in the GSM, specific way using identities pertaining only to GSM. Storage space for the TMSI in a SIM-card is 72 bits. Therefore, "SIM roaming" allows to move also the TMSI from one mobile equipment to another within GSM systems. The "new" MS then performs a location attempt to the GSM network using the "old" TMSI as described above.

For user anonymity reasons, it is desirable to also have TMSI-roaming between different systems with different kind of air interfaces, i.e. also the TMSI allocated for the user and stored to the SIM card in an "old" mobile radio system is also transferred to a "new" mobile radio system by SIM roaming. The problem, however, is that the TMSI as specified for GSM does not have any relevancy in other mobile radio systems. Further, the GSM SIM card contains only a single storage location for a single TMSI. Therefore, a method is needed to differentiate between TMSI's of different mobile radio systems and to store them in GSM SIM cards in an uniform way.

Figure 5:
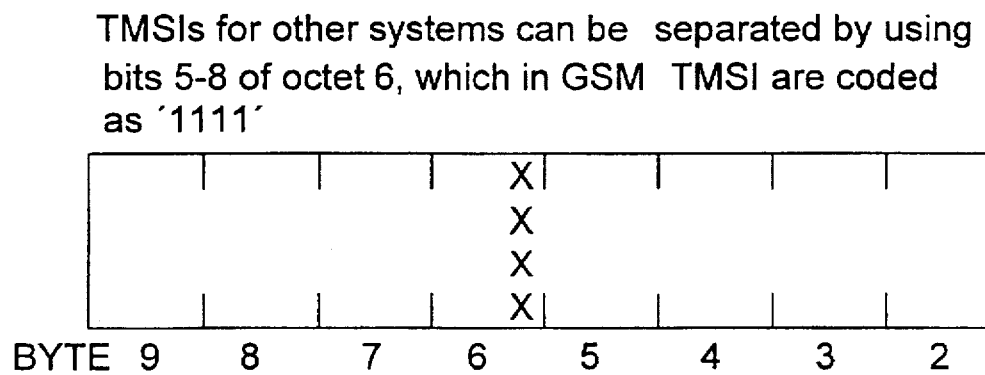
FIG. 5 illustrates the universal TMSI format according to the invention.

In the preferred embodiment of the present invention, the above mentioned problem is solved by utilizing the bits 5 to 8 of the octet 6 in the TMSI to differentiate between different TMSI's of different systems. According to the invention, these bits are coded in all mobile radio systems in an uniform manner to indicate the mobile radio system which has allocated the TMSI. The remaining bit locations of the TMSI may be used in a mobile radio system-specific format. For example, if these bits are coded as "1111" for identifying the TMSIs of GSM900/DCS1800 systems, as shown in FIG. 4. All other codings of the bits 5 to 8 in the octet 6 may be used to identify TMSIs of other mobile radio systems, as shown by "xxxx" in FIG. 5.

A preferred embodiment of the "SIM roaming", or particularly TMSI roaming, according to the invention will be described below with reference to the FIGS. 6 and 7.

Figure 6:
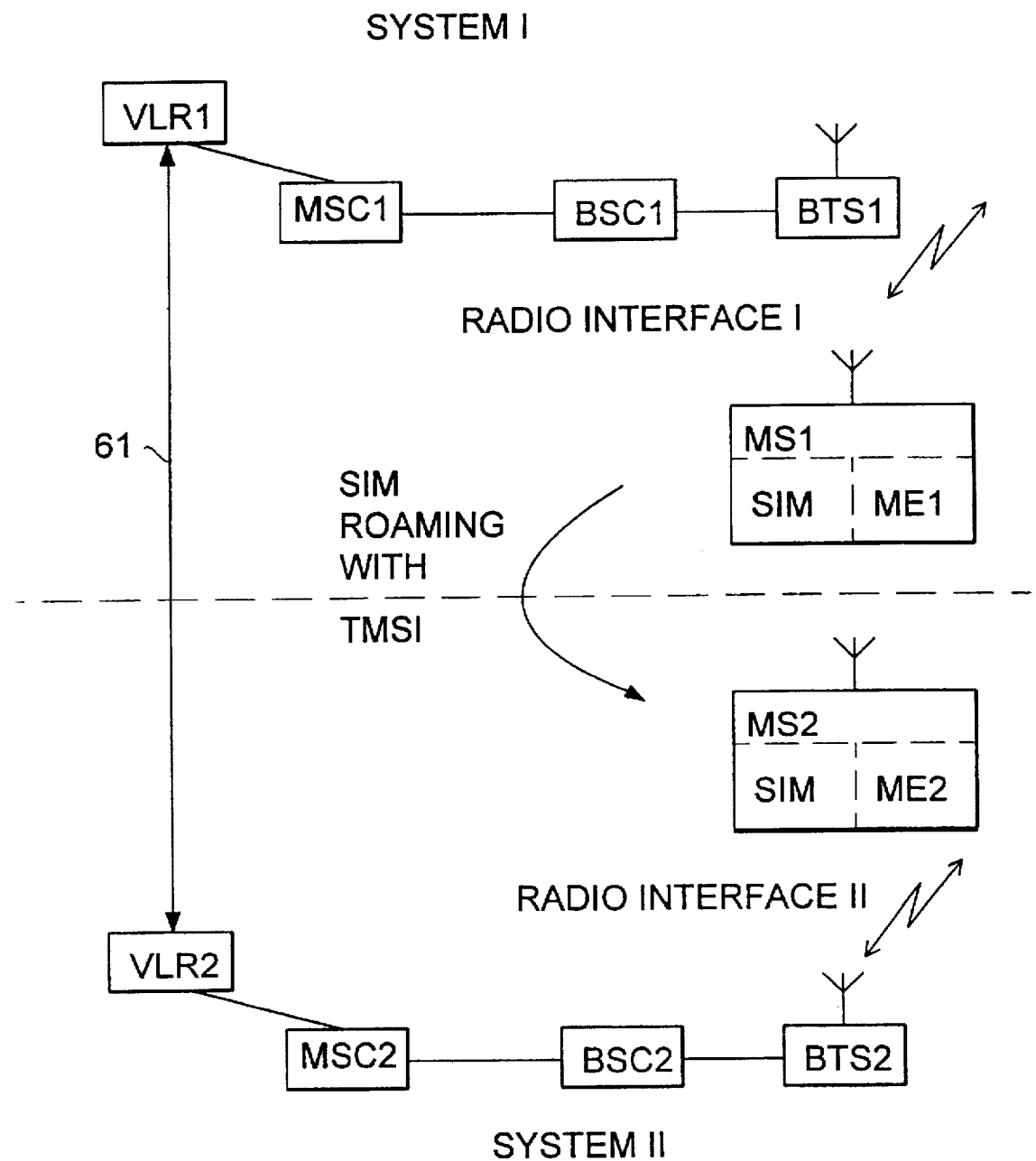
FIG. 6 illustrates a TMSI-roaming between two mobile radio systems.

In FIG. 6, two interconnected mobile radio systems I and II with different radio interfaces I and II, respectively, are shown. Assume that the mobile radio system I is in accordance with GSM specifications including the radio interface I. Only the network elements necessary to the description of the invention are shown in FIG. 6, namely visitor location register VLR1, mobile exchange MSC1, base station controller BSC1, and base station BTS1. Further, a mobile station MS1 consists of a removable subscriber identification module SIM, as well as a mobile equipment ME1 containing the hardware and software specific for communication of the radio interface I.

Similarly, only the network elements of the mobile radio system II necessary for describing the present invention are shown in FIG. 6, namely visitor location register VLR2, a mobile exchange MSC2, a base station controller BSC2, and a base station BTS2. The mobile radio system II may follow the same network standard as the mobile radio system I, namely GSM MAP, or any other network standard, e.g. IS-41. However, the radio interface II of the system II is different from the radio interface I of the system I, e.g. operates on different band of carrier frequencies. FIG. 6 shows also a mobile station MS2 of the mobile radio system II consisting of a subscriber identification module SIM, and mobile equipment ME2 containing the hardware and software specific for communication of the radio interface II. The minimum requirement for the present invention is that the SIM format used in system I be similar to or compatible with the SIM used in system II. Further, for purposes of the present invention, an interconnection link between the VLR1 and VLR2 is shown. The interconnection between the mobile radio system I and II may be, however, embodied by any other type of the interconnection enabling the IMSI request to be passed, according to the present invention.

Firstly, let us assume that a mobile subscriber is using the mobile radio system I. The SIM of the mobile subscriber is inserted into the reading device of mobile equipment ME1 of the mobile station 1. The mobile station has performed a location-updating in one of the location areas of the VLR1. Consequently the VLR1 has allocated to the mobile subscriber a TMSI for this location area. In the allocated TMSI, the bits 5 to 8 of the octet 6 are coded as "1111" for identifying the mobile radio system I. Octets 8 and 9 of the TMSI contain the location area code of the current location area of the MS1. The VLR1 will send the allocated TMSI to the mobile station MS1 in which the TMSI is stored, into the predetermined storage location of the SIM.

Let us next assume that the mobile subscriber wishes to use the mobile radio system 2 in which he/she also is an authorized mobile user. To that end he/she removes the personal SIM from the MS1 and inserts it into the reading device of the MS2 in the mobile radio system II. The mobile equipment ME2 of the MS2 reads the stored TMSI from the inserted SIM of the mobile subscriber, and makes a copy of the TMSI to an air interface message. It should be noted that the use and the operation of the SIM and the mobile stations MS1 and MS2 in the process according to the present invention may be similar to that of the prior SIMs and MSs. The MS2 will send the TMSI, in a location attempt, for example, over the radio interface II to the network part of the system II in which the TMSI is forwarded to the VLR2.

Figure 7:
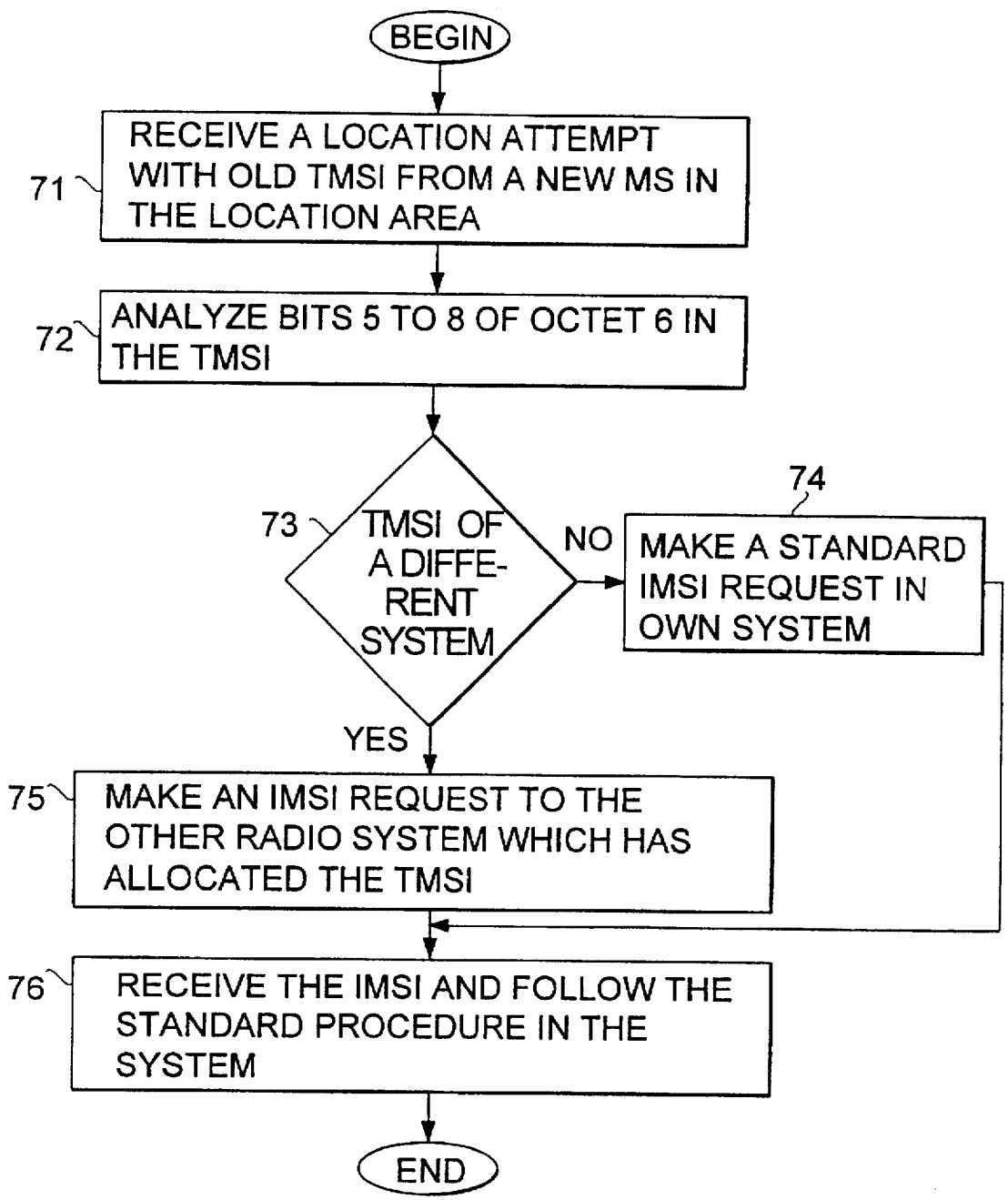
FIG. 7 is a flow diagram illustrating operation of a visitor location register VLR2 in the roaming of FIG. 6.

Referring now to the flow chart of FIG. 7, the VLR receives a location attempt from a new MS2 in one of its location areas. Also, the old TMSI allocated to the mobile subscriber in the mobile radio system I is received at the VLR2 at step 71. Then the VLR2 analyses bits 5 to 8 of octet 6 in the TMSI, in steps 72 and 73, in order to find out the actual structure of the old TMSI and the mobile radio system that allocated the old TMSI. If the decision in the step 73 is that the old TMSI is allocated by the same mobile radio system, namely system II, VLR2 makes a standard IMSI request in mobile radio system II, unless the old TMSI is already known by the VLR2, in step 74. In the present example, the VLR2 detects that the bits 5 to 8 of octet 6 in the TMSI are coded as "1111", and the decision that the old TMSI belongs to the mobile radio system I is made in step 73. As a consequence, the VLR2 requests the actual user identity, IMSI, from the VLR1 of the mobile radio system I because the VLR1 is the only place containing mapping between the old TMSI and the actual user identity in step 75. The request is made by using the system identification information obtained from the TMSI to find the old VLR and by sending the old TMSI to the VLR2. The VLR2 will respond by sending the IMSI and, optionally, other subscriber data to the VLR2. The VLR2 receives the IMSI in step 76, and then follows the standard network procedure utilized in the mobile radio system II.

The figures and the description associated are only intended to illustrate the present invention. Changes and modifications to the described embodiments are possible without going beyond the scope and spirit of the attached claims.

I claim:

1. An inter-system roaming method, comprising the steps of:

allocating a temporary mobile subscriber identity for a mobile subscriber in a first mobile radio system having a first radio interface, including indicating the identity of said mobile radio system in predetermined bit locations in said temporary mobile subscriber identity in a system-independent format, sending said temporary mobile subscriber identity to a first mobile station of said mobile subscriber, said mobile station comprising a removable subscriber identification module for storing data related to an identification and authentication of a mobile subscriber, as well as a first mobile equipment capable of operating in said first mobile radio system, storing said temporary mobile subscriber identity in a predetermined storage location in said removable subscriber identification module, removing said mobile subscriber identification module from said first mobile station, inserting said mobile subscriber identification module in a second mobile station comprising a second mobile subscriber equipment capable of operating in a second mobile radio system having a second radio interface, copying said temporary mobile subscriber identity from said mobile subscriber identification module to said second mobile subscriber equipment, sending said temporary mobile subscriber identity to a fixed network of said second mobile radio system, analyzing said predetermined bit locations in said temporary mobile subscriber identity in order to find said identity of said first mobile radio system, and requesting an actual identity of said mobile subscriber from said first mobile radio system according to said identity of said first mobile radio system as found by said analyzing, and said temporary mobile subscriber identity.

2. Roaming method as claimed in claim 1, wherein said step of allocating said temporary mobile subscriber identity is performed by a visitor location register in said first mobile radio system.

3. Roaming method as claimed in claim 1, wherein said steps of analyzing and requesting are performed by a visitor location register in said second mobile radio system.

4. A mobile radio system, comprising:

a mobile exchange, a plurality of mobile stations each including a removable subscriber identification module for storing data related to an identification and authentication of a mobile subscriber, as well as a first mobile equipment capable of operating in said mobile radio system, and a visitor location register, including:

means for allocating temporary mobile subscriber identities for mobile subscribers in said mobile radio system, an identity of said mobile radio system being indicated in predetermined bit locations in said temporary mobile subscriber identity in a, system-independent format, means for analyzing said predetermined bit locations in a temporary mobile subscriber identity received from a mobile station in order to find an identity of a mobile radio system which has allocated the temporary mobile subscriber identity, and means for requesting an actual identity of said mobile subscriber from a mobile radio system which has allocated said temporary mobile subscriber identity according to said identity of said analyzed first mobile radio system identity and said temporary mobile subscriber identity.

* * * * *